US006946203B1

(12) United States Patent
Lockhart et al.

(10) Patent No.: US 6,946,203 B1
(45) Date of Patent: Sep. 20, 2005

(54) MULTILAYER POLYOLEFIN SUBSTRATE WITH LOW DENSITY CORE AND STIFF OUTER LAYERS

(75) Inventors: Mark W. Lockhart, Fairport, NY (US); Jason Chaneske, Canandaigua, NY (US); Robert M. Sheppard, Victor, NY (US)

(73) Assignee: Exxon Mobil Oil Corporation, Irving, TX (US)

( * ) Notice: Subject to any disclaimer, the term of this patent is extended or adjusted under 35 U.S.C. 154(b) by 210 days.

(21) Appl. No.: 10/335,818

(22) Filed: Dec. 31, 2002

(51) Int. Cl.$^7$ ............................................. B32B 27/08
(52) U.S. Cl. ..................... 428/515; 428/516; 428/910
(58) Field of Search ............................. 428/515, 516, 428/910

(56) References Cited

U.S. PATENT DOCUMENTS

| | | | |
|---|---|---|---|
| 3,227,664 A | 1/1966 | Blades et al. ................. 521/144 |
| 3,227,784 A | 1/1966 | Blades et al. ................. 264/53 |
| 3,250,731 A | 5/1966 | Buhl et al. ................. 264/45.9 |
| 3,557,265 A | 1/1971 | Chisholm et al. .......... 264/46.1 |
| 3,787,543 A | 1/1974 | Parrish ........................ 264/53 |
| 3,808,300 A | 4/1974 | Miyamoto et al. ............ 264/53 |
| 3,893,957 A | 7/1975 | Mixon et al. ................. 260/2.5 |
| 4,055,695 A | 10/1977 | Last et al. ................... 428/195 |
| 4,086,383 A | 4/1978 | Yamano et al. ............. 428/174 |
| 4,124,336 A | 11/1978 | Johnson ........................ 425/4 |
| 4,206,165 A | 6/1980 | Dukess ..................... 264/45.9 |
| 4,377,661 A | 3/1983 | Wright et al. ............... 524/522 |
| 4,533,578 A | 8/1985 | Boyd et al. .................. 428/35 |
| 4,578,297 A | 3/1986 | Duncan ........................ 428/35 |
| 4,657,811 A | 4/1987 | Boyd et al. ............... 428/318.6 |
| 4,701,370 A | 10/1987 | Park ......................... 428/314.4 |
| 4,758,396 A | 7/1988 | Crass et al. ................. 264/145 |
| 4,911,978 A | 3/1990 | Tsubone et al. ......... 428/317.9 |
| 5,000,992 A | 3/1991 | Kelch ........................ 428/36.5 |
| 5,006,598 A | 4/1991 | Adams et al. ............... 524/601 |
| 5,063,264 A | 11/1991 | Nakajima ................... 524/118 |
| 5,066,434 A | 11/1991 | Liu et al. ..................... 264/37 |
| 5,176,954 A | 1/1993 | Keller et al. ............. 428/317.9 |
| 5,212,053 A | 5/1993 | McSweeney et al. ........ 430/503 |
| 5,369,135 A | 11/1994 | Campbell et al. ............ 521/134 |
| 5,382,473 A | 1/1995 | Musclow et al. ............ 428/353 |
| 5,393,603 A | 2/1995 | Toyoda et al. ............ 428/316.6 |
| 5,500,282 A | 3/1996 | Heffelfinger et al. ....... 428/339 |
| 5,552,011 A | 9/1996 | Lin ....................... 156/244.18 |
| 5,667,902 A | 9/1997 | Brew et al. ................. 428/5.8 |
| 5,885,721 A * | 3/1999 | Su et al. ..................... 428/516 |
| 6,001,290 A | 12/1999 | Lin ............................ 264/129 |
| 6,030,756 A | 2/2000 | Bourdelais et al. ......... 430/363 |
| 6,303,233 B1 | 10/2001 | Amon et al. ................. 428/516 |
| 6,387,529 B1 | 5/2002 | Peet ............................ 428/516 |

FOREIGN PATENT DOCUMENTS

| | | |
|---|---|---|
| EP | 551 894 A1 | 7/1993 |
| EP | 470 760 | 5/1997 |
| EP | 888 866 A1 | 1/1999 |
| EP | 1 209 518 A2 | 5/2002 |
| JP | 03087255 | 12/1991 |
| WO | WO94/06849 | 3/1994 |
| WO | WO96/12766 | 5/1996 |
| WO | WO 98/04403 | 2/1998 |

OTHER PUBLICATIONS

"Chemical Sensitization and Environmental Effects", The Theory of the Photographic Process, Chapter 5, pp. 151–152, 4th Edition, 1977.
J.L. Koenig et al., "Integrated Infrared Band Intensity Measurement of Stereoregularity in Polypropylene", Journal of Applied Polymer Science, vol. 9, pp. 359–367, 1965.
Jack L. Koenig, "Chemical Microstructure of Polymer Chains", pp. 341–346, 1980.

* cited by examiner

*Primary Examiner*—Monique R. Jackson
(74) *Attorney, Agent, or Firm*—Rick F. James

(57) ABSTRACT

A biaxially oriented thermoplastic structure including a low density core layer formed from polypropylene, highly crystalline polypropylene or high density polyethylene, and outer layers formed from highly crystalline polypropylene or high density polyethylene. The thickness of the core layer is about 60 to about 95% of the overall thickness of the structure. The stiffness of the structure in the machine direction is in a range from about 0.015 to about 0.15 pound force-centimeters.

20 Claims, No Drawings

MULTILAYER POLYOLEFIN SUBSTRATE WITH LOW DENSITY CORE AND STIFF OUTER LAYERS

BACKGROUND OF THE INVENTION

The present invention relates to thermoplastic structures which exhibit high bending stiffness. These structures exhibit a paper-like feel and can be used to replace paper in numerous applications, such as various printing and imaging applications.

Cellulose fiber, i.e. paper, is typically used as a substrate for imaging technologies, such as for photographs, ink jet images or digital images. Advantageously, paper has good stiffness properties and is low in cost. However, paper as an image-receiving substrate poses several difficulties in its manufacturing process and its use.

For example, a significant weakness of paper is moisture uptake. Paper must be specifically and expensively formulated to resist moisture absorption. For example, in the formation of color paper for photographs and other imaging technologies, paper requires application of a polymer layer, typically a polyethylene layer. In addition to waterproofing the paper, this layer provides a smooth surface upon which imaging layers are formed. However, the formation of such a suitably smooth surface is difficult requiring great care and expense to ensure proper laydown and cooling of the polyethylene layers. An air bubble may become trapped between the forming roller and the polyethylene, forming a pit that will cause defects in the imaging surface.

Moreover, the assembly process of applying a polymer surface to a paper base involves at least a two step operation. The paper base is made and then transferred to an extrusion machine for application of the polymer layer. The machine that produces the raw paper base is specialized for such purpose and often does not efficiently run the same speed and width as machinery which applies the polymer layer.

Additionally, substrates which contain paper have a tendency to curl during development and storage. Such curl is thought to be caused by the disparate properties of the layers making up the substrate as it is subjected to the developing and drying processes. This is especially true when the paper at the middle of a imaging substrate gains or loses water, thereby pushing against stiffer plastic moisture insensitive layers bonded to the outside of the paper. Also, substrates containing paper will curl when they are subjected to extended high humidity or extremely low humidity.

Also, developing and processing images using substrates containing paper present difficulties. Substrates with a paper base do not have the required strength properties to be reliability processed in wet chemistry common with the imaging development process. For example, when the backlighted photographic display materials are processed, the web can break causing a loss in efficiency in commercial photoprocessing labs. Further, thin papers (e.g., as disclosed in U.S. Pat. No. 5,212,053) are not strong enough for efficient transport in digital printing equipment such as ink jet printers or thermal dye transfer printers.

Paper-like films (that is, films that exhibit "paper-like" surface textures) which do not contain paper fiber as a base have been disclosed. (See e.g., PCT/US95/11222: PCT/CA93/00385; and EP 91307049.6.) These paper-like films can be fabricated to be heavy or lightweight. However, both types of these films present limitations. For example, these lightweight films are not stiff like paper, and thus are not desirable for commercial use, such as for photographic imaging technologies. The heavy films are stiff. However, since these heavy films are dense solid structures, or are filled with certain additives, they have a low yield. That is, for a fixed weight of production material, the area of usable film product is low vis-à-vis less dense structures. Thus, the production of these heavy films is not cost efficient.

Accordingly, there remains a need for paper-like image-receiving substrates that are lightweight yet stiff enough for use in commercial applications. Additionally, there remains a need for paper-like image-receiving substrates which have the desired stiffness properties but minimize the material used in the product, thereby reducing cost. Also, there remains a need for paper-like image-receiving substrates which are easier to manufacture.

SUMMARY OF THE INVENTION

The present invention provides stiff thermoplastic structures with a paper-like feel that are capable of being used with photographic and imaging technologies. These structures are characterized by having a relatively thick low density interior core layer and two relatively thin outer, i.e. exterior, layers designated as top and bottom outer layers. The three layers are made up of highly crystalline polypropylene or high density polyethylene.

The thickness of the core layer is about 60 to about 95%, preferably about 70 to about 80%, of the overall thickness of the structure. The core layer has a density in the range of from 0.1 to 0.7 g/cm3.

The stiffness of the structure in the machine direction is in a range from about 0.015 to about 0.15 pound force-centimeters, preferably, in the range from about 0.03 to about 0.08 pound force-centimeters.

Preferably, these three layer structures coextrusions. Alternatively, these three layer structures can be laminations. In the case wherein these structures are laminations, these structures further include tie layers. A first tie layer is provided between the core layer and the top outer layer; a second tie layer is provided between the core layer and the bottom outer layer. Preferably the first and/or second tie layer includes low density polyethylene or ethylene vinyl acetate.

The core layers of these thermoplastic structures are foamed or cavitated. Preferably, the cavitated core layers include polybutene terephthalate; calcium carbonate; nylon; or preformed glass, metal or ceramic spheres. In the case wherein polybutene terephthalate is used, it is preferably present at a level of at most about 15 wt % of said core layer.

These structures are biaxially oriented. Preferably, the biaxial orientation involves stretching these thermoplastic structures about 6 to 9 times in the transverse direction, and about 4 to 6 times in the machine direction.

The thermoplastic structures of the present invention can further include an image-receiving layer exterior to, and on the same side as, the top outer layer. The image-receiving layer comprises a polyolefin, such as polypropylene and polyethylene. Preferably, the polyolefin of the image-receiving layer is surface treated by flame, corona, or plasma treatment. The image-receiving layer is capable of bearing an ink-based or photographic image. The ink-based image can made from solvent based inks, water based inks, and radiation cured inks.

Preferably, the thermoplastic structures which include the image-receiving layer are coextrusions. Alternatively, the image-receiving layer can be laminated onto the three layer structure. Additionally, the image-receiving layer can be in the form of a coating.

The structures of the present invention can include additives. For example, the top and/or bottom outer layers can include a whitener, an opacifying agent and/or an optical brightener. Preferably, the whitener is titanium dioxide. The image-receiving layer can include a color additive. Preferably, the color additive is a blue or red tint.

These structures can further comprise a matte layer exterior to, and on the same side of the bottom outer layer. The matte layer comprises ethylene-propylene-butylene terpolymers, ethylene-propylene copolymers, propylene-butylene random copolymers, linear low density polyethylenes, and blends thereof.

The thermoplastic image-receiving structures of the present invention provide several advantages over currently used image-receiving substrates.

For example, these structures are a more durable and lasting alternative to paper based substrates. Also, unlike paper which must be specifically and expensively formulated to resist moisture absorption, the structures of the present invention are wholly comprised of polymers, and thus are inherently moisture resistant. In addition, unlike paper which requires special treatment to exhibit smooth surfaces, the surfaces of the structures of the present invention are inherently smooth. Also, unlike paper, these structures exhibit very uniform transmissive optical properties.

Some prior art paper-like films may overcome the disadvantages of paper-based substrates, however, these films do not exhibit the stiffness required for various printing and imaging technologies. The structures of the present invention exhibit high stiffness properties which enable these structures to be used in various imaging technologies, such as silver halide emulsion, ink jet, thermal receiver, litho etc.

In one embodiment, the structures of the present invention are a single composite coextrusion. Accordingly, the expense and inconvenience of separately fabricating and preparing each layer is avoided. That is, the structures of the present invention can be manufactured in a single operation.

Furthermore, the image-receiving layers of the present structures are suitable for receiving printed images without additional treatment. All additives necessary for such imaging technologies are placed into the melt before coextrusion or lamination.

For a better understanding of the present invention, reference is made to the following description, taken in conjunction with the accompanying drawing, and the scope of the invention set forth in the claims.

DETAILED DESCRIPTION OF THE INVENTION

The thermoplastic structures of the present invention comprise a thick low density polyolefin core layer, and outer layers which have a high elastic modulus. These structures exhibit a high bending stiffness. The bending stiffness of the overall structure is higher than the sum of the stiffnesses of the individual layers to an unexpected degree. These structures exhibit a paper-like feel and can be used to replace paper in numerous applications, such as various printing and imaging applications.

In one embodiment, these structures comprise three layers, that is, a core layer and two outer layers. The core layer comprises the interior of these thermoplastic structures. An outer layer is on each side of the core layer. One outer layer is designated as the "top outer layer;" the other outer layer is designated as the "bottom outer layer." The three layers of these structures can be coextruded or laminated to one another.

The three layer coextruded structures, or the laminated structures, can further comprise an image-receiving layer which is exterior to, and on the same side of, the top outer layer of the structures. That is, the top outer layer is between the core layer and the image-receiving layer. In one embodiment, this image-receiving layer is coextruded along with the three layer coextruded structure to form a four layer coextrusion. In another embodiment, the image-receiving layer is laminated to the three layer coextrusion. In another embodiment, the image-receiving layer is laminated to the laminated structures. In another embodiment, the image-receiving layer is coated onto the three layer coextruded structure, or onto the laminated structure.

The structures comprising the image-receiving layer can further comprise a layer with a rough surface, designated as the "matte layer." The matte layer is exterior to, and on the same side of, the bottom outer layer of the structure. That is, the bottom outer layer is between the core layer and the matte layer. In one embodiment, the matte layer is coextruded along with the four layer coextruded structure. In another embodiment, the matte layer is laminated to the four layer coextrusion or the laminated structure.

In the embodiments of the present invention in which layers are laminated together, the structure further comprises tie layers. The tie layers are placed between the layers which are laminated together. For example, in one embodiment, the tie layers are between the core layer and each of the outer layers. The tie layers can comprise any polymer which holds together the two layers to be joined. For example, tie layers can comprise low density polyethylene or ethylene vinyl acetate.

The core layer of the structures of the present invention comprise polypropylene, highly crystalline polypropylene or high density polyethylene. The two outer layers of these structures comprise highly crystalline polypropylene or high density polyethylene.

An example of a suitable polypropylene for use in this invention is FINA 3371.

The highly crystalline polypropylene (HCPP) of the present invention has a high isotactic stereoregularity, resulting in higher crystallinity than conventional isotactic polypropylene, i.e. greater than about 93% stereoregularity, preferably from 94 to 99%, more preferably from 94 to 98%. (Conventional isotactic polypropylene is defined herein as having an isotactic stereoregularity of from about 90% to about 93%).

Suitable HCPP resins include Amoco 9117 and Amoco 9119, available from Amoco Chemical Co. of Chicago, Ill.; Chisso HF5010 and Chisso XF2805, available from Chisso Chemical Co., Ltd. of Tokyo, Japan; and Exxon 4252, available from ExxonMobil of Baytown, Tex. HCPPs are also available from Solvay of Brussels, Belgium.

The HCPP exhibits higher stiffness and surface hardness; lower deflection at higher temperatures; and better creep properties than conventional isotactic polypropylene. Further information relating to HCPP, including methods for preparation thereof, is disclosed in U.S. Pat. Nos. 5,063,264; 5,500,282 and 5,667,902, which patents are incorporated herein by reference in their entireties.

For purposes of the present invention, stereoregularity can be determined by IR spectroscopy according to the procedure set out in "Integrated Infrared Band Intensity Measurement of Stereoregularity in Polypropylene," J. L. Koenig and A. Van Roggen, Journal of Applied Polymer Science, Vol. 9, pp. 359–367 (1965) and in "Chemical Microstructure of Polymer Chains," Jack L. Koenig, Wiley-Interscience Publication, John Wiley and Sons, New York, Chichester, Brisbane, Toronto. Stereoregularity can also be determined by decahydronaphthalene (decalin) solubility and nuclear magnetic resonance spectroscopy (NMR).

The high density polyethylene (HDPE) of the present invention includes polymers made with Ziegler-Natta or Phillips type catalysts, as well as metallocene catalysts. The HDPE is a semicrystalline polymer available in a wide range of molecular weight as indicated by either melt index or high-load melt index.

The Melt Index (MI) of the HDPE of the present invention is in the range of from about 1 to about 10, preferably from about 2 to about 8, most preferably from about 2.5 to about 6, and optimally from about 3 to about 5. (Melt Index is expressed as g/10 min.) Melt index is generally understood to be inversely related to viscosity, and decreases as molecular weight increases. Accordingly, higher molecular weight HDPE generally has a lower melt index. Methods for determining melt index are known in the art, e.g., ASTM D 1238.

The density of the HDPE polymer is in the range from about 0.94 to about 0.97 g/cm3, preferably from about 0.95 to about 0.965 g/cm$^3$ as defined by ASTM. The melting point of HDPE polymer, measured by a differential scanning calorimeter (DSC), is in a range from about 120 to about 150° C., preferably from about 125 to about 135° C.

Examples of commercially available HDPE polymers for use with the present invention include HD 7845.30 (d=0.958) by ExxonMobil; Marlex TR-130 from Phillips Chemical Company; M6211 (d=0.958) from Lyondell Petrochemicals, Co.; BDM 94-25 (d=0.961) and 6573 XHC (d=0.959), both available from Fina Oil and Chemical Co., Dallas, Tex.; Sclair 19C (d=0.951) and 19F (d=0.96 1), both available from Nova Corporation, Sarnia, Ontario, Canada; and Dow XU 6151.302 from Dow Chemical Co. Additionally, the HDPE polymers of U.S. Pat. No. 6,387,529 are incorporated herein by reference.

The core layer of the thermoplastic structures of the present invention has a low density. The density of the core layer is in the range of from about 0.1 to about 0.7 g/cm3 of the polyolefin, preferably from about 0.1 to about 0.6, more preferably from about 0.1 to about 0.5, most preferably from about 0.1 to about 0.4, and optimally from about 0.1 to about 0.3 g/cm3 of the polyolefin.

The low density of the core layer can be achieved by cavitation or foaming of the polyolefin of the core layer. The core layer has a density of at least 35% less than the density of the corresponding uncavitated/unfoamed version of the layer, more preferably at least 40% less, most preferably at least 50% less, and optimally at least 60% less than the density of the corresponding uncavitated/unfoamed version of the layer. In other terms, the core layer has a void volume of at least 35%, more preferably from about 40% to about 60%.

In one embodiment, the core layer is cavitated by the addition of cavitating agents (void-initiating particles) to the polyolefin material of the core layer. Cavitating agents are usually in the form of particles. By including such particulate material in the polyolefin batch used to produce the core layer, the resulting core layer includes the particulate material dispersed throughout the layer. Upon orientation of the layer, the dispersed particulate material causes a strata of voids to form at the location of the particulate material.

The cavitating agents can be any suitable organic or inorganic material which is incompatible with the core material at the temperature of biaxial orientation. The term "incompatible" means that the materials are in two distinct phases.

The particles of the cavitating agent useful in the present invention can be of any particle size ranging from about $0.5\mu$ to about $25\mu$ in diameter, preferably from about $2\mu$ to about $10\mu$ in diameter.

The cavitating agent comprises from about 4 percent by weight to about 25 percent by weight of the cavitated core layer, preferably from about 10 percent by weight to about 15 percent by weight of the cavitated core layer.

Examples of cavitating agents suitable for use in the structures of the present invention include organic or inorganic, particles or powders. The organic or inorganic, particles or powders may be regular or irregular in shape, for instance, the particles may be elongated, planar or spherical. The particles or powders may be composed of materials such as calcium carbonate (CaCO3, e.g. from aragonite, calcite, chalk, limestone, marble or oyster shells), mica or other minerals, polyamides, polyesters, acetals, acrylic resins (including polymers and copolymers of acrylic acid, methacrylates, acrylic esters an acrylonitrile), nylons, glass particles (including silica), soda ash or lime, solid preformed glass spheres, hollow preformed glass spheres, polybutylene terephthalate (PBT), cyclic olefin polymers and cyclic olefin copolymers (COCs), metal beads, metal spheres, ceramic spheres (especially silicate spheres), ceramic particles, such as ceramic beads, or mixtures of any of the above. In the case wherein polybutene terephthalate is used, it is preferably present at a level of at most about 15wt % of the core layer, or from about 6wt % to about 8wt % of the core layer. When more than one cavitating agent is present in the core layer, and those agents include CaCO3, then PBT is not preferred as the second cavitating agent.

Commercially available examples of cavitating agents include the PBT, Ticona 1300A (Trademark of Ticona); and the CaCO3, Omyacarb FT (Trademark of Omyacarb).

The cavitating agent can be coated with agents to facilitate voiding. Suitable agents or lubricants include colloidal silica, colloidal alumina, and metal oxides such as tin oxide and aluminum oxide. The preferred agents are colloidal silica and alumina, most preferably, silica.

The cavitating agent can contribute to the opacity of the structures of the present invention if the core layer polyolefin and the particles of cavitating agent differ in refractive indices. Alternatively, transparency of the structures can be achieved by ensuring that the core layer polyolefin and the particles of cavitating agent have substantially similar or identical refractive indices.

Further information relating to cavitating agents and polymers containing voids, including methods for preparation thereof, is disclosed in U.S. Pat. Nos. 6,303,233; 5,176,954; and 4,377,661; the disclosure of these patents are incorporated herein by reference in their entireties.

In another embodiment, the core layer is foamed. Any of the foaming agents and foaming procedures employed in the manufacture of foamed polymers can be suitably employed herein including those described in U.S. Pat. Nos. 3,227,664; 3,227,784; 3,250,731; 3,787,543; 3,808,300; 3,893,957; 4,055,695; 4,124,336; 4,206,165; 4,533,578; 4,701,370; and 5,369,135, the contents of which patents are incorporated herein by reference in their entireties. Foaming agents of both the solvent and the chemical type can be used.

For example, generally any gaseous or liquid organic material which is a solvent for the polyolefin of the core layer and which boils at temperatures of from about −45° C. to about +7° C. is suitable. Examples of solvent-type foaming agents which are used herein include the low boiling hydrocarbons, such as the butanes (n-butane and isobutane), pentane (n-pentane and isopentane), n-hexane, etc.; and halogenated hydrocarbons, such as monochlorotrifluoromethane, monochlorodifluoromethane, dichlorodifluoromethane, dichlorotetrafluoroethylene, trichloroethylene, chloroform, carbon tetrachloride, etc.

Chemical foaming agents which can be used herein include, for example, azo bis(formamide); diazoaminobenzene; N,N'-dinitrosopentamethylene tetramine; N,N'-dimethyl-N,N'-dinitrosoterephthalamide; p,p'-oxy-bis(benzene sulfonyl semicarbazide); azo bis(isobutyronitrile); p,p',oxy-bis(benzene sulfonyl hydrazide); p,p'-diphenyl-bis(sulfonyl hydrazide); benzene-sulfonyl hydrazide; m-benzene-bis(sulfonyl hydrazide); and poly(azidoformate).

An example of a commercially available foaming agent is sold by Uni-Royal under the trade name of "Celogen A. Z."

Examples of commercially available foamed polypropylene film are TOYOPEARL P4255 and TOYOPEARL P4256, manufactured by Toyoboseki Co., Ltd.

The thickness of the core layer of the three layer structure accounts for the bulk of the thickness of the overall structure. For example, the thickness of the core layer is in a range of from about 60 to about 95% of the overall three layer structure thickness, preferably from about 65 to about 95%, more preferably from about 70 to about 95%, most preferably from about 75 to about 95%, and optimally from about 80 to about 95% of the overall three layer structure thickness.

The three layer structure has an overall thickness in a range of between about 3 mils to about 11 mils, preferably from about 4 to about 10 mils, more preferably from about 5 to about 9 mils, most preferably from about 6 to about 8 mils, and optimally from about 7 to about 8 mils.

The outer layers can be of equal or different thicknesses. These layers may each have a thickness between about 0.5 and 2.2 mils, more preferably, between about 1.0 and 2.0 mils.

The outer layers exhibit a high elastic modulus. Elastic modulus can be defined as the ratio of stress to strain, wherein the stress value is the force required to produce a given strain, or bend, in a material. Elastic modulus is expressed in units of force, for example, in lb/in2.

The resultant structure is biaxially oriented. The resultant structure includes the laminations, coextrusions and combinations thereof; and includes the three or more layers described herein. The structure is stretched from about 3 times to about 6 times, preferably from about 4 times to about 5 times in the machine direction (MD), and from about 4 times to about 10 times, preferably from about 7 times to about 8 times in the transverse direction (TD). Methods of biaxial orientation are disclosed in U.S. Pat. No. 6,303,233, the disclosure of which is incorporated herein by reference in its entirety.

The stiffness of the structure in the machine-direction is unexpectedly high. The stiffness as defined herein is a resistance to bend. The stiffness is in a range from about 0.015 to about 0.15 pound force-centimeters, preferably from about 0.018 to about 0.12 pound force-centimeters, more preferably from about 0.02 to about 0.1 pound force-centimeters, most preferably from about 0.025 to about 0.09 pound force-centimeters, and optimally from about 0.035 to about 0.075 pound force-centimeters. The stiffness in the transverse direction is substantially greater than the stiffness in the machine direction. In one embodiment, the stiffness value in the machine direction is less than 0.75 times the value in the transverse direction.

The top and/or bottom outer layers of the structures further comprise whiteners or opacifying agents. Examples of these agents include TiO2, CaCO3, BaSO4, ZnS, MgCO3, clay, talc, kaolin or any other highly reflective white compound. These agents enhance imaging responses, such as whiteness or sharpness. These agents are included in a range of about 2% to about 20% by weight of an outer layer, preferably from about 4% to 15%, more preferably from about 6% to about 10%, and most preferably from about 7% to about 9%.

Titanium dioxide is a particularly preferred agent. The TiO2 used can be either anatase or rutile type. In the case of optical properties, rutile is the preferred because of the unique particle size and geometry. Further, anatase and rutile TiO2 can be blended to improve both whiteness and sharpness. Examples of TiO2 that are acceptable for an imaging system are DuPont Chemical Co. R101 rutile TiO2 and DuPont Chemical Co. R104 rutile TiO2.

Optical brighteners can also be included in the top and/or bottom outer layers. Optical brighteners are typically fluorescent agents that absorb energy in the ultraviolet region and emit light largely in the blue region. Examples of optical brighteners for use in the present invention include 4,4'-diaminostilbene-2,2'-disulfonic acid; derivatives of 4,4'-diamino-stilbene-2,2'-disulfonic acid; coumarin derivatives, such as 4-methyl-7-diethylamino-coumarin; 1,4-bis(O-cyanostyryl)benzol; 2-amino-4-methyl-phenol; and 2,2'-(1,2-ethene-diyldi-4,1-phenylene)benzoxazole. Examples of preferred optical brighteners include Eastobrite® OB-1 produced by Eastman Chemical Company, USA and Horstalux® produced by BASF. An optical brightener can be included up to about 2% by weight in either or both of the outer layers of the structure of the present invention. Preferably from about 0.05% to about 0.5% by weight of optical brightener is included in the top outer layer.

The image-receiving layer of the structures of the present invention is capable of bearing an ink-based or photographic image. The image-receiving layer can be coextruded along with the core layer, and the two outer layers; or the image-receiving layer can be a laminated to the three layer coextrusion or lamination.

In one embodiment, the image-receiving layer comprises a polyolefin resin, such as polyethylene or polypropylene. In this embodiment, the image-receiving layer is preferably surface-treated with corona, plasma or flame treatment.

In another embodiment, the image-receiving layer is a coating on the top outer layers of the structures of the present invention. In particular, a coating is applied onto the three-layer coextrusion or lamination. The coating comprises a prime coating and a top coating as described in U.S. Pat. No. 5,382,473, which patent is incorporated herein by reference in its entirety.

Before prime coating the structures, the exposed surface of the top outer layer can be treated. Such surface treatments can include corona treatment, flame treatment or plasma treatment, and other surface treatment methods well known in the art. For example, the surface can be corona discharge treated to about 38–42 dynes/cm by standard commercial techniques.

The prime coating material comprises the reaction product of an acidified aminoethylated vinyl polymer and an epoxy resin; a poly(ethyleneimine); or any mixtures thereof. A prime coating is described in U.S. Pat. No. 5,066,434, the disclosure of which is incorporated herein in its entirety by reference.

The prime coat is then top-coated with a polyester composition. An example of such a top-coat is described in Example 13 of U.S. Pat. No. 5,006,598.

The coating can be applied to the top outer layer as a dispersion or as a solution, from an organic vehicle, for example, an alcohol or an aromatic hydrocarbon, such as xylene or a mixture thereof. Conventional methods, such as roll coating, bar coating, gravure coating, and gravure reverse coating can be used to apply the coating. The coverage of the coating on the top outer layer is preferably 0.5 to 10 g/m2.

The image-receiving layer can further comprise color additives (i.e. colorants/tints). Color additives used in this invention may be any color additives that do not have an adverse impact on the image-receiving layer, or image.

The addition of these color additives can be accomplished by any process which is known in the art including the machine blending of a color concentrate prior to extrusion. Colored pigments that can resist extrusion temperatures greater than 320° C. are preferred, as temperatures greater than 320° C. are necessary for coextrusion.

Addition of colored tint from about 0% up to about 30% weight of the total layer weight are contemplated, with about 5% to about 25% being preferred, and about 10% to about 20% being optimal.

Blue tints enhance the visual whiteness of the image-receiving layer and are preferred. Preferred blue colorants include blue pigments, such as phthalocyanine blue pigments, cromophtal blue pigments, irgazin blue pigments, pigment Blue 60, irgalite organic blue pigments, cobalt aluminate pigments, and cobalt chromium aluminate inorganic blue pigments. An example of a particularly preferred blue tint is the Cobalt Blue tint, Sheppard Blue 214 produced by Sheppard Chemical Company.

Alternatively, a red tint can be incorporated into the image-receiving layer. The red tint can be any red tint that provides improved flesh tones or apparent warmth of an image formed on the image-receiving layer. In a preferred aspect, the red tint is an acridone tint, such as for instance a quinacridone or a derivative of a quinacridone. An example of a particularly preferred red tint useful in enhancing the optical properties of the films of the present invention is the acridone tint, RT-790 produced by Ciba-Geigy.

As used herein, an ink-based image formed on the exposed surface of the image-receiving layer includes images formed with nonphotographic or nonsilver halide technology. The structures of the present invention can be used to replace paper in these types of image forming processes.

Examples of images formed from nonphotographic technology include electrographic, electrophotographic, ink jet, thermal dye transfer, flexographic and rotogravure printing. These processes of forming images are well known in the art.

In the electrographic and electrophotographic processes, an electrostatic image is created on the exposed surface of the image-receiving layer of the structures of the present invention. The electrostatic image is developed with charged, colored particles (toner). There are numerous variations in these processes. The use of liquid toners in place of dry toners is an example of such variations.

In the ink jet printing process, an image is formed by the firing of a plurality of discrete drops of ink from one or more nozzles onto the exposed surface of the image-receiving layer placed adjacent to the nozzles.

The thermal dye transfer method produces colored hard copies. According to the method, a thermal transfer sheet using sublimation dye as recording agent is placed on the exposed surface of the image-receiving layer, and then the sublimation dye is transferred to the image-receiving layer by heating the thermal transfer sheet in correspondence with electric recording signals, whereby images are printed.

Flexography is an offset letterpress technique where printing plates are made from rubber or photopolymers. The printing is accomplished by the transfer of the ink from the raised surface of the printing plate to the exposed surface of the image-receiving layer.

The Rotogravure method of printing uses a print cylinder with thousands of tiny cells which are below the surface of the printing cylinder. The ink is transferred from the cells when the print cylinder is brought into contact with the exposed surface of the image-receiving layer.

Inks suitable for use with the structures of the present invention include solvent based inks, water based inks, and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion, styrene maleic anhydride resins, and other synthetic polymers. Examples of radiation cured inks include ultraviolet and electron beam cure inks.

In the embodiments wherein the image-receiving layer is part of a coextrusion or is a laminated layer, ink adhesion coatings can be used to allow for more efficient printing of images. In particular, the exposed surface of the image-receiving layer can be coated with any materials known in the art to improve ink adhesion to biaxially oriented polyolefin surfaces. Examples of such materials include acrylic coatings and polyvinyl alcohol coatings. Alternatively, the exposed surface of the image-receiving layer can be surface treated to improve ink adhesion. Examples of surface treatment include corona, flame and plasma treatment.

In addition to being capable of receiving ink-based images, in another embodiment, the image formed on the image-receiving layer is photographic. In this embodiment, the image-receiving layer is coated with photographic elements in the form of emulsions. These elements and emulsions are well known in the art.

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. Alternatively, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated onto the image-receiving layer of the structures of the present invention. Various coating techniques include dip coating, air knife coating, curtain coating and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

The matte layer of the structures of the present invention comprises a polymer selected from the group consisting of ethylene-propylene-butylene (EPB) terpolymers, ethylene-propylene (EP) copolymers, propylene-butylene random copolymers, linear low density polyethylenes, and blends thereof.

The matte layer is characterized by having an exposed surface roughness average, Ra, of greater than $0.30\mu$. The roughness average can be measured by a TAYLOR-HOBSON Surtronic 3 with a $2\mu$ diameter ball tip, and a built in cutoff filter to reject the signal from spatial frequencies larger than 0.25 mm. This surface roughness allows the structures of the present invention to more efficiently be transported in printing and photoprocessing equipment where problems such as scratching, machine jams, and poor print stacking may occur. Also, a minimum roughness inhibits the sticking of the bottom side of these structures to the smooth image-receiving layers of these structures.

In order to further improve certain properties of the resultant structures of the present invention, effective amounts of additives such as antiblock agents, antistatic agents, Or slip agents can be blended into any layer of these structures. Preferably, these agents are incorporated into the matte layer, or placed on the exposed surface of the matte layer.

Antiblock agents and antistatic agents inhibit the sticking together of the structures. Slip agents reduce the coefficient of friction of the structures. These properties improve the characteristics of the structures for ease of manufacturing and processing, and ease of use in image-forming machinery.

Antiblock agents and slip agents include various forms of coated or uncoated silica, silicones, siloxanes, silicon oils and cross-linked silicones. Other useful anti-block/slip agents include, for example, methyl acrylate and non-migratory slip agents, as well as many others well known in the art. Other suitable slip agents include aliphatic acid amides, aliphatic acid esters, waxes, metallic soaps and polydimethylsiloxanes. Other suitable antiblock agents include talc, clay, and sodium aluminum silicate.

Suitable antistatic agents include alkali alkane sulfonates; and essentially straight-chain, saturated aliphatic monoamines, diamines, and tertiary amines. Examples of suitable antistatic agents include cocoamine; and N,N-bis (2-hydroxyethyl)sterylamine.

Preferably, up to about 1% of the weight of the matte layer can contain the antiblock, slip and/or antistatic agents. More preferably, from about 0.1 wt % to about 0.5wt % of these agents, and optimally, from about 0.15% to about 0.25% of these agents can be included in the matte layer.

The image-receiving layer can contain a release agent for the purpose of preventing heat fusing between the colorant-receptive layer and a thermal transfer sheet during the formation of an image. Silicone oil, phosphate plasticizers, and fluorine compounds can be used as the release agent. Among them, silicone oil is preferred. The amount of the release agent added is preferably 0.2 to 30 parts by weight based on the particular polymer used to form the image-receiving layer.

The coextrusion, quenching, orienting, and heat setting of the structures of the present invention can be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

In particular, methods for coextruding multilayer foamed polymer structures are also known. For example, see U.S. Pat. Nos. 5,000,992; 3,557,265; 4,533,578 and 4,657,811. These patents are incorporated herein by reference in their entireties.

The layers of the structure can be coated or treated after the coextrusion and orienting process or between casting and full orientation with any number of coatings which may be used to improve the properties of the structures, such as for example, improving the adhesion of inks to the exposed surface of the image receiving layer, as described above.

Thus, while there have been described what are presently believed to be the preferred embodiments of the present invention, other and further embodiments, modifications, and improvements will be known to those skilled in the art, and it is intended to include all such further embodiments, modifications, and improvements and come within the true scope of the claims as set forth below.

EXAMPLES

Examples 1 and 2 describe laminated structures of the present invention. Examples 3 and 4 describe coextrusions of the present invention. The examples illustrate the unexpectedly high stiffness in the machine-direction effected by the overall structures vis-à-vis the sum of the stiffnesses of each individual layer.

Example 1

Laminated structure A with relative stiffness expressed in Gurley units

|  | Relative Stiffness | |
|---|---|---|
| Layer 1: Oriented HCPP at 1 mil | MD = 1.8 mg | TD = 3.1 mg |
| Layer 2: LDPE at 0.5 mil | MD = <1 mg | TD = <1 mg |
| Layer 3: Foamed PE sheet at 5 mil | MD = 60.4 mg | TD = 67.4 mg |
| Layer 4: LDPE at 0.5 mil | MD = <1 mg | TD = <1 mg |
| Layer 5: Oriented HCPP at 1 mil | MD = 1.8 mg | TD = 3.1 mg |
| TOTAL Laminate Stiffness: | MD = 493 mg | TD = 824 mg |

Laminated structure A with stiffness expressed in $1 \times 10^{-5}$ lbf-cm

|  | Stiffness | |
|---|---|---|
| Layer 1: Oriented HCPP at 1 mil | MD = 6.6 | TD = 12.5 |
| Layer 2: LDPE at 0.5 mil | MD = 0.08 | TD = 0.08 |
| Layer 3: Foamed PE sheet at 5 mil | MD = 167 | TD = 192 |
| Layer 4: LDPE at 0.5 mil | MD = 0.08 | Th = 0.08 |
| Layer 5: Oriented HCPP at 1 mil | MD = 6.6 | TD = 12.5 |
| TOTAL Laminate Stiffness: | MD = 2600 | TD = 4800 |

Example 2

Laminated structure B with relative stiffness expressed in Gurley units

|  | Relative Stiffness | |
|---|---|---|
| Layer 1: Oriented HCPP at 1.3 mil | MD = 4.0 mg | TD = 6.5 mg |
| Layer 2: LDPE at 0.5 mil | MD = <1 mg | TD = <1 mg |
| Layer 3: Cavitated, Oriented PP at 3.03 mil | MD = 5.9 mg | TD = 47.8 mg |
| Layer 4: LDPE at 0.5 mil | MD = <1 mg | TD = <1 mg |
| Layer 5: Oriented HCPP at 1.3 mil | MD = 4.0 mg | TD = 6.5 mg |
| TOTAL Laminate Stiffness: | MD = 216 mg | TD = 358 mg |

Laminated structure B with stiffness expressed in $1 \times 10^{-5}$ lbf-cm

|  | Stiffness | |
|---|---|---|
| Layer 1: Oriented HCPP at 1.3 mil | MD = 16 | TD = 28 |
| Layer 2: LDPE at 0.5 mil | MD = 0.08 | TD = 0.08 |
| Layer 3: Cavitated, Oriented PP at 3.03 mil | MD = 96.6 | TD = 153 |
| Layer 4: LDPE at 0.5 mil | MD = 0.08 | TD = 0.08 |
| Layer 5: Oriented HCPP at 1.3 | MD = 16 | TD = 28 |
| TOTAL Laminate Stiffness: | MD = 1200 | TD = 2100 |

Example 3

| | Coextrusions A, B and C | | |
|---|---|---|---|
| | A | B | C |
| Layer 1 | 0.28 mil PP; MD Stiffness: 1.1 E-9 lbf-cm | 0.28 mil PP; MD Stiffness: 1.1 E-9 lbf-cm | 0.48 mil PP; MD Stiffness: 1.1 E-9 lbf-cm |
| Layer 2 | 0.64 mil wht PP; MD Stiffness: 1.39 E-5 lbf-cm | 0.73 mil wht PP; MD Stiffness: 2.05 E-5 lbf-cm | 1.41 mil wht PP; MD Stiffness: 1.48 E-4 lbf-cm |
| Layer 3 | 4.08 mil voided PP; MD Stiffness: 2.16 E-3 lbf-cm | 6.22 mil voided PP; MD Stiffness: 7.64 E-3 lbf-cm | 7.03 mil voided PP; MD Stiffness: 1.1 E-2 lbf-cm |
| Layer 4 | 0.25 mil wht PP; MD Stiffness: 8.2E-7 lbf-cm | 0.35 mil wht PP; MD Stiffness: 2.3E-6 lbf-cm | 0.54 mil wht PP; MD Stiffness: 8.3E-6 lbf-cm |
| Layer 5 | 0.28 mil PP; MD Stiffness: 1.2E-6 lbf-cm | 0.33 mil PP; MD Stiffness: 1.9E-6 lbf-cm | 0.52 mil PP; MD Stiffness: 7.4E-6 lbf-cm |
| Total Optical Gauge | 5.53 mil | 7.91 mil | 9.98 mil |
| Total Gurley Stiffness, MD | 152 mg | 438 mg | 760 mg |
| Total MD Stiffness (lbf-cm) | 7.43E-3 | 2.10E-2 | 4.75E-2 |

Note: "wht PP" is polypropylene with 6% $TiO_2$

Example 4
Five-Layer Coextrusion (Single pass oriented structure)

| | Layer | Thickness | | Young's Modulus |
|---|---|---|---|---|
| | | mils | cm | Lbs/in² |
| 1 | MDPE + Color Additives | 0.03 | 0.000076 | 50,000 |
| 2 | HCPP + 8% $TiO_2$ | 1.15 | 0.002913 | 400,000 |
| 3 | Cavitated or Foamed PP | 7.00 | 0.017733 | 150,000 |
| 4 | HCPP + 8% $TiO_2$ | 1.15 | 0.002913 | 400,000 |
| 5 | Matte surface | 0.10 | 0.000253 | 100,000 |

TOTAL Stiffness of Coextrusion: 0.0506 lbf.-cm (Gurley Stiffness 975.7 mg)
Layers 2, 3 and 4 can also be made of HDPE.
Note: Sb-Stiffness is Bending Stiffness.

We claim:

1. A thermoplastic structure comprising:
   a) a low density core layer comprising polypropylene, highly crystalline polypropylene or high density polyethylene, said core layer having a density in the range of from 0.1 to 0.7 grams per cubic centimeters;
   b) a top outer layer comprising highly crystalline polypropylene or high density polyethylene, said top outer layer being exterior to, and on a first side of, said core layer; and
   c) a bottom outer layer comprising highly crystalline polypropylene or high density polyethylene, said bottom outer layer being exterior to, and on a side of, said core layer;
   wherein the thickness of said core layer is about 60 to about 95% of the overall thickness of said structure; wherein said structure is biaxially oriented; and wherein the stiffness of said structure in the machine direction is in a range from about 0.015 to about 0.15 pound force-centimeters.

2. The thermoplastic structure according to claim 1 wherein said structure is a coextrusion.

3. The thermoplastic structure according to claim 1 wherein said structure is a lamination.

4. The thermoplastic structure according to claim 1 wherein said structure is stretched about 4 to about 10 times in the transverse direction, and about 3 to about 6 times in the machine direction.

5. The thermoplastic structure according to claim 1 wherein the thickness of said core layer is about 70 to about 80% of the overall thickness of said structure.

6. The thermoplastic structure according to claim 1 wherein the stiffness of said structure in the machine direction is in the range from about 0.035 to about 0.075 pound force-centimeters.

7. The thermoplastic structure according to claim 1 wherein said polypropylene, highly crystalline polypropylene or said high density polyethylene of said core layer is foamed or cavitated.

8. The thermoplastic structure according to claim 7 wherein said cavitated core layer comprises polybutene terephthalate; calcium carbonate; nylon; or performed glass, metal or ceramic spheres.

9. The thermoplastic structure according to claim 8 wherein said polybutene terephthalate of said core layer comprises at most about 15wt % of said core layer.

10. The thermoplastic structure of claim 1 further comprising:
    (a) an image-receiving layer exterior to, and on the same side as, said top outer layer, said image-receiving layer comprising a polyolefin wherein said image-receiving layer is capable of receiving an ink-based or photographic image; and
    (b) a matte layer exterior to, and on the same side of said bottom outer layer.

11. The thermoplastic structure of claim 10 wherein said image-receiving layer is surface treated.

12. The thermoplastic structure according to claim 10 wherein said structure is a coextrusion.

13. The thermoplastic structure according to claim 10 where said image-receiving layer is a lamination.

14. The thermoplastic structure according to claim 10 wherein said image-receiving layer is a coating.

15. The thermoplastic structure according to claim 10 wherein said image-receiving layer is capable of bearing solvent based inks, water based inks, and radiation cured inks.

16. A thermoplastic structure according to claim 1 further comprising:
    (a) a first tie layer in between and core layer and said top outer layer, and
    (b) a second tie layer in between said core layer and said bottom outer layer.

17. A thermoplastic structure according to claim 16 wherein either, or both, said first and second tie layer comprises low density polyethylene or ethylene vinyl acetate.

18. The thermoplastic structure according to claim 1 wherein either, or both said top and bottom outer layer further comprises a whitener, an opacifying agent, an optical brightener or combinations thereof.

19. The thermoplastic structure according to claim 10 wherein said image-receiving layer further comprises a color additive.

20. The thermoplastic structure according to claim 10 wherein said matte layer comprises ethylene-propylene-butylene terpolymers, ethylene propylene copolymers, propylene-butylene random copolymers, linear low density polyethylenes, or blends thereof.

* * * * *